United States Patent
Ahtikari

(10) Patent No.: US 12,223,795 B2
(45) Date of Patent: Feb. 11, 2025

(54) METHODS, APPARATUSES AND COMPUTER PROGRAM PRODUCTS FOR REQUESTING USER AUTHORIZATION AND RESPONDING TO REQUESTED USER AUTHORIZATION FOR ELECTRIC VEHICLE CHARGING SESSIONS

(71) Applicant: LIIKENNEVIRTA OY / VIRTA LTD, Helsinki (FI)

(72) Inventor: Jussi Ahtikari, Helsinki (FI)

(73) Assignee: Liikennevirta Oy / Virta Ltd, Helsinki (FI)

( * ) Notice: Subject to any disclaimer, the term of this patent is extended or adjusted under 35 U.S.C. 154(b) by 489 days.

(21) Appl. No.: 17/442,060

(22) PCT Filed: Mar. 26, 2020

(86) PCT No.: PCT/FI2020/050198
§ 371 (c)(1),
(2) Date: Sep. 22, 2021

(87) PCT Pub. No.: WO2020/193869
PCT Pub. Date: Oct. 1, 2020

(65) Prior Publication Data
US 2022/0172550 A1 Jun. 2, 2022

(30) Foreign Application Priority Data
Mar. 27, 2019 (FI) ...................................... 20195236

(51) Int. Cl.
*G06F 7/10* (2006.01)
*G06K 7/10* (2006.01)
(Continued)

(52) U.S. Cl.
CPC ....... *G07F 15/005* (2013.01); *G06K 7/10297* (2013.01); *G06K 7/10366* (2013.01); *B60L 53/305* (2019.02)

(58) Field of Classification Search
CPC .. G07F 15/005; G06K 7/10366; B60L 53/305
See application file for complete search history.

(56) References Cited

U.S. PATENT DOCUMENTS

2010/0315197 A1* 12/2010 Solomon .................. H02J 7/00
340/5.2
2011/0241824 A1* 10/2011 Uesugi .................. H02J 7/0047
320/109
(Continued)

FOREIGN PATENT DOCUMENTS

| CN | 102684253 A | 9/2012 |
| CN | 105109357 A | 12/2015 |

(Continued)

OTHER PUBLICATIONS

International Search Report for Application No. PCT/FI2020/050198, Mailed Jun. 8, 2020, 3 pages.
(Continued)

*Primary Examiner* — Nabil H Syed
(74) *Attorney, Agent, or Firm* — Lippes Mathias LLP

(57) ABSTRACT

The present disclosure relates generally to electric vehicles, and more specifically to methods, apparatuses, and computer program products for requesting user authorization for electric vehicle charging sessions and responding to the requested user authorization. The methods, apparatuses, and computer program products described herein allow a user of an EV to use his/her single already-existing physical electronic key in order for him/her to be authorized for EV charging sessions at EV charging stations of different charging service providers. By so doing, it is possible to avoid the need to produce and mail new physical electronic keys each (Continued)

intended to be used at the EV charging stations of a different charging service provider, thereby significantly reducing the time of the user authorization.

21 Claims, 6 Drawing Sheets

(51) Int. Cl.
*G07F 15/00* (2006.01)
*B60L 53/30* (2019.01)

(56) References Cited

U.S. PATENT DOCUMENTS

| 2012/0239571 | A1 | 9/2012 | Boot |
| 2013/0238536 | A1 | 9/2013 | Outwater et al. |
| 2014/0097795 | A1 | 4/2014 | Turner et al. |
| 2016/0267730 | A1 | 9/2016 | Wadhwani et al. |
| 2017/0243418 | A1 | 8/2017 | Outwater et al. |
| 2022/0032810 | A1* | 2/2022 | Rietfort ............... B60L 53/14 |

FOREIGN PATENT DOCUMENTS

| CN | 108665342 A | 10/2018 |
| EP | 2500209 A2 | 9/2019 |
| JP | 2012053821 A | 3/2012 |
| JP | 2012155718 A | 8/2012 |
| JP | 2012196123 A | 10/2012 |
| WO | 2012012023 A1 | 1/2012 |

OTHER PUBLICATIONS

Finnish Search Report for Application 20195236, dated Jun. 28, 2019, 1 page.
Office Action for JP 2021-558512 dated Jan. 10, 2023, 6 pages.
Office Action for Chinese Application 202080025208.2, dated May 30, 2022, 11 pages.

* cited by examiner

METHODS, APPARATUSES AND COMPUTER PROGRAM PRODUCTS FOR REQUESTING USER AUTHORIZATION AND RESPONDING TO REQUESTED USER AUTHORIZATION FOR ELECTRIC VEHICLE CHARGING SESSIONS

TECHNICAL FIELD

The present disclosure relates generally to electric vehicles, and more specifically to methods, apparatuses, and computer program products for requesting user authorization for electric vehicle charging sessions and responding to the requested user authorization.

BACKGROUND

Electric vehicle (EV) users typically need to be authorized at EV charging stations before they can start EV charging sessions there. This user authorization is performed by using some physical electronic key, such, for example, as a user smart card. Each physical electronic key is provided with its own key identifier (ID) which is used for the user authorization. More specifically, a user of a certain EV to be charged at an EV charging station of interest should show or apply his/her physical electronic key to a key reader arranged at the EV charging station and configured to retrieve the key ID. After that, the charging station sends the key ID to a charging service provider managing the EV charging station in order to check whether the key ID is indicated in a pre-created user account belonging to that user. If this is the case, the charging station is instructed to enable an EV charging session for the EV.

From the above, it follows that the physical electronic key should first be linked to the user account before the user can use it to start the EV charging session. A traditional solution for implementing the user authorization above involves producing and linking physical electronic keys to user accounts on the charging service provider's side, and then mailing the physical electronic keys to users themselves. However, this solution suffers from the following drawbacks:
- the users need to wait usually at least 1-2 weeks (or even longer) to obtain their physical electronic keys;
- there are always extra handling and processing costs for the charging service provider;
- since there may be several charging service providers in a geographical area where a user is living, the user needs to have several physical electronic keys to be served at the EV charging stations owned by these different charging service providers.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the present disclosure to provide methods, apparatuses, and computer program products for requesting user authorization for electric vehicle charging sessions and responding to the requested user authorization.

The object above is achieved by the features of the independent claims in the appended claims. Further embodiments and examples are apparent from the dependent claims, the detailed description and the accompanying drawings.

According to a first aspect, a method for requesting user authorization for electric vehicle (EV) charging sessions is provided. The method is performed as follows. At first, an EV is detected at an EV charging station of interest. The EV charging station is provided with a station identifier (ID). Then, a user of the EV is requested to apply an available physical electronic key having a key ID to a key reader arranged at the EV charging station, thereby retrieving the key ID of the available physical electronic key. After that, a charging service provider, with which the user has a pre-created user account, is requested to link the available physical electronic key to the user account. This is done by sending a user request to the charging service provider. The user account is characterized by a user ID, and the user request itself comprises the station ID of the EV charging station, the user ID, and the key ID of the available physical electronic key. Finally, a notification of user authorization or non-authorization for the EV charging sessions at the EV charging station is received from the charging service provider. The type of the notification depends on whether the available physical electronic key has been linked to the user account. According to an embodiment, the user of the EV may gain access to EV charging stations of different charging service providers with the aid of his/her single already-existing or available physical electronic key.

In one implementation form of the first aspect, the physical electronic key comprises a smart card, Radio Frequency Identification (RFID) card, Near Field Communication (NFC) token, or Bluetooth token, and the key reader comprises a card reader or a token reader. This makes an embodiment more flexible in use.

In one implementation form of the first aspect, the steps of detecting, requesting, sending, and receiving are performed by using a mobile application installed on a user mobile device. This may, for example, simplify and hasten the process of requesting the user authorization.

In one implementation form of the first aspect, the step of detecting comprises using the mobile application to: locate the user device; select the EV charging station which is the closest to the user mobile device; and request the user of the EV to confirm the selection of the closest EV charging station. This allow, for example, hastening the retrieval of the station ID, thereby reducing the time required for requesting the user authorization.

In one implementation form of the first aspect, the method further comprises the following steps. If the user of the EV cancels the selection of the closest EV charging station, the user of the EV is provided by using the mobile application with a list of available EV charging stations in the vicinity of the user device. After that, the user of the EV is requested to select the EV charging station of interest manually. This may allow avoiding possible location errors caused, for example, by the incorrect operation of the mobile application or some other locating means, such as a built-in GPS sensor in the user mobile device.

In one implementation form of the first aspect, the method further comprises: triggering a repeating countdown timer in the mobile application; and repeating said requesting the user to confirm the selection of the closest EV charging or to select the EV charging station of interest manually every time there is no confirmation of the closest EV charging station or no selection of one other of the list of available EV charging stations before the expiration of the repeating countdown timer. This may, for example, provide a recurring reminder to the user of the EV about the action to be taken.

In one implementation form of the first aspect, the method further comprising, after the step of requesting the user of the EV to apply the physical electronic key: triggering a repeating countdown timer in the mobile application; and repeating said requesting every time the user does not apply the physical electronic key before the expiration of the repeating countdown timer. This may also provide a recurring reminder to the user of the EV about the action to be taken.

In one implementation form of the first aspect, the method further comprises, if the notification of user authorization is received, the step of notifying the user that he/she is authorized to use the EV charging station for recharging the EV from now on by reapplying the physical electronic key to the key reader. This may facilitate the user to learn faster how to start the EV charging session.

According to a second aspect, a method for responding to requested user authorization for electric vehicle (EV) charging sessions is provided. The method is performed on the charging service provider's side as follows. At first, a user request sent by a user of an EV from an EV charging station of interest is received. The user request relates to linking an available physical electronic key belonging to the user of the EV to a pre-created user account. The user account is characterized by a user ID, and the user request itself comprises a station ID of the EV charging station, the user ID, and a key ID of the available physical electronic key. The key ID is retrieved by applying the available physical electronic key to a key reader arranged at the EV charging station. Then, it is checked whether the user request meets a pre-defined linking criterion. According to said checking, it is decided whether to link the available physical electronic key to the user account. Next, based on the decision made, a notification of user authorization or non-authorization for the EV charging sessions is sent to the user of the EV and the EV charging station. In an embodiment, the user of the EV may be granted access to EV charging stations of different charging service providers with the aid of his/her single already-existing or available physical electronic key, thereby avoiding extra costs for producing and mailing new physical electronic keys.

In one implementation form of the second aspect, the physical electronic key comprises a smart card, Radio Frequency Identification (RFID) card, Near Field Communication (NFC) token, or Bluetooth token, and the key reader comprises a card reader or a token reader. This may make the embodiment more flexible in use.

In one implementation form of the second aspect, the pre-defined linking criterion is as follows: the user account does not comprise the same key ID as the retrieved key ID of the available physical electronic key. With such a linking criterion, it may, for example, be possible to avoid linking the same physical electronic key more than one time to the user account.

In one implementation form of the second aspect, the step of checking comprises verifying that the user request does not meet the pre-defined linking criterion. In this case, the step of deciding comprises deciding not to link the available physical electronic key to the user account. However, the user and the EV charging station are both informed about the user authorization for the EV charging sessions. In an embodiment, it may be possible to avoid the undue linking of the same physical electronic key to the user account.

In another implementation form of the second aspect, the step of checking comprises verifying that the user request meets the pre-defined linking criterion. In this case, the step of deciding comprises deciding to link the available physical electronic key to the user account by adding the key ID to the user account. At the same time, the step of sending comprises sending the notification of user authorization to the user and the EV charging station. This may provide the user with quick access to the EV charging station.

In one implementation form of the second aspect, the step of receiving comprises the steps of: storing the station ID, the user ID, a reception time of the user request, and a pre-defined expiration time of the user request as a new record in a database of user requests; and marking the user request as being processed until the expiration time of the user request is over. This may allow processing the user requests from different users more efficiently.

In one implementation form of the second aspect, the pre-defined linking criterion comprises the following sub-criteria: (i) the user account does not comprise the same key ID as the retrieved key ID of the available physical electronic key; (ii) the database of user requests comprises the record corresponding to the user request from the user of the EV; and (iii) the user request is still marked as being processed. With such a linking criterion, for example, the processing of the user requests may become more efficient.

In one implementation form of the second aspect, the step of checking comprises verifying that sub-criteria (i)-(iii) above are all met. In this case, the step of deciding comprises deciding to link the available physical electronic key to the user account by adding the key ID to the user account. At the same time, the step of sending comprises sending the notification of user authorization to the user and the EV charging station. This may provide the user with quick access to the EV charging station.

In another implementation form of the second aspect, the step of checking comprises verifying that sub-criterion (i) is met but any one of sub-criteria (ii) and (iii) is not met. In this case, the step of deciding comprises deciding not to link the available physical electronic key to the user account. At the same time, the step of sending comprises sending the notification of user non-authorization to the user and the EV charging station. According to an embodiment, this may, for example, ensure that only suitable users are provided with the user authorization for the EV charging sessions at the EV charging station.

In one implementation form of the second aspect, the user account is further characterized by an account balance. In this case, the method further comprises the steps of: temporarily disabling the user authorization for the EV charging sessions if the account balance is not enough to cover the costs for the next EV charging session; and notifying the user of the EV that the user authorization will be enabled upon refilling the account balance. This may make the method according to the second aspect more flexible in use.

According to a third aspect, an apparatus for requesting user authorization for electric vehicle (EV) charging sessions is provided. The apparatus comprises at least one processor and a memory coupled to the at least one processor and storing processor-executable instructions. The processor-executable instructions, when executed by the at least one processor, cause the at least one processor to perform the method according to the first aspect. According to an embodiment, the user of the EV can gain access to EV charging stations of different charging service providers with the aid of his/her single already-existing physical electronic key.

According to a fourth aspect, an apparatus for responding to requested user authorization for electric vehicle (EV) charging sessions is provided. The apparatus comprises at least one processor and a memory coupled to the at least one processor. The memory stores processor-executable instructions, a database of user accounts, and a database of user requests. The processor-executable instructions, when executed by the at least one processor, cause the at least one processor to perform the method according to the second aspect. According to an embodiment, the user of the EV can be granted access to EV charging stations of different charging service providers with the aid of his/her single already-existing physical electronic key, thereby avoiding extra costs for producing and mailing new physical electronic keys.

According to a fifth aspect, a computer program product comprising a computer-readable storage medium storing a computer program is provided. Being executed by at least one processor, the computer program causes the at least one processor to perform the method according to the first aspect. Thus, the method according to the first aspect can be embodied in the form of the computer program, thereby providing flexibility in use thereof.

According to a sixth aspect, a computer program product comprising a computer-readable storage medium storing a computer program is provided. Being executed by at least one processor, the computer program causes the at least one processor to perform the method according to the second aspect. Thus, the method according to the second aspect can be embodied in the form of the computer program, thereby providing flexibility in use thereof.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which.

DETAILED DESCRIPTION

Figure 1:
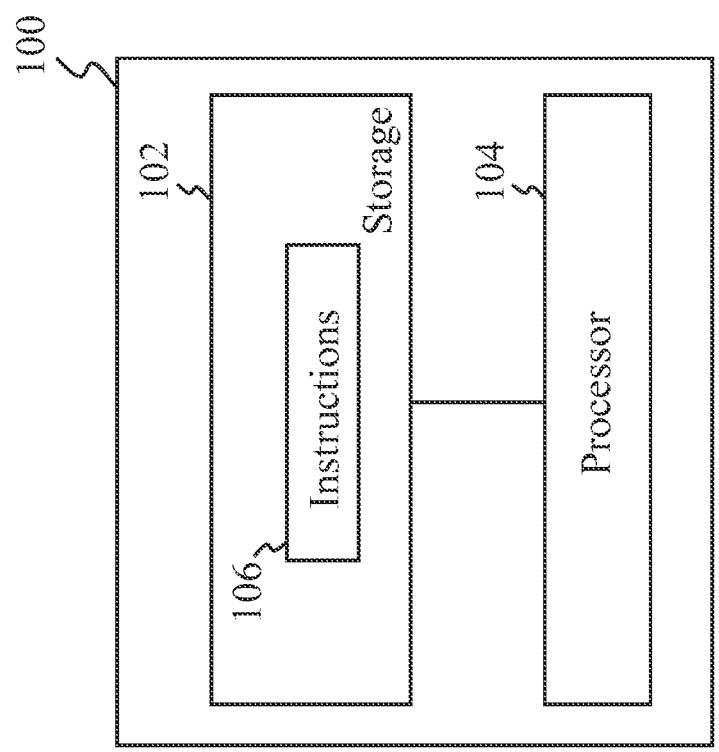
FIG. 1 shows a block-scheme of an apparatus for requesting user authorization for EV charging sessions in accordance with one embodiment of the present disclosure.

Various embodiments of the present disclosure are further described in more detail with reference to the accompanying drawings. However, the present disclosure can be embodied in many other forms and should not be construed as limited to any certain structure or function disclosed in the following description. In contrast, these embodiments are provided to make the description of the present disclosure detailed and complete.

According to the present disclosure, it will be apparent to those skilled in the art that the scope of the present disclosure covers any embodiment, which is disclosed herein, irrespective of whether this embodiment is implemented independently or in concert with any other embodiment of the present disclosure. For example, the apparatuses and methods disclosed herein can be implemented by using any numbers of the embodiments provided herein. Furthermore, it should be understood that any embodiment of the present disclosure can be implemented using one or more of the elements or steps presented in the appended claims.

In embodiments of the present disclosure, an electric vehicle charging station or, shortly, EV charging station comprises an element in an infrastructure that supplies electric energy for the recharging of electric vehicles. It should be noted that the embodiments of the present disclosure may equally be used in relation to different kinds of electric vehicles, such as electric cars, aircrafts and vessels. Correspondingly, the EV charging stations may be located along different roads if the electric vehicles are represented by the electric cars. In case of the electric aircrafts, the EV charging stations may be located at different airports. Being applicable to the electric vessels, the EV charging stations may be located at different seaports.

In embodiments of the present disclosure, a user or customer may relate to a person who wants to use the EV charging station in order to recharge an electric vehicle. The person may be either an owner, driver, pilot, captain, or a simple passenger of such an electric vehicle.

In embodiments of the present disclosure, a charging service provider comprises a company that provides access for the user to its own EV charging station(s). To gain such access, the user needs to identify himself/herself at the EV charging station by using a special physical electronic key having a unique key identifier (ID). This identification is hereinafter referred to as user authorization. Some examples of the physical electronic key includes a smart card, chip card, integrated circuit card (ICC), Radio Frequency Identification (RFID) card, Near Field Communication (NFC) token, and Bluetooth token. The physical electronic key needs first to be linked to a user account created by the charging service provider before the user can use it to recharge the electric vehicle at the EV charging station belonging to that charging service provider. Said linking is performed by storing the key ID to a database of user accounts resided on the charging service provider's side.

As noted earlier, the physical electronic key is traditionally produced by the charging service provider itself, whereupon it is sent by post to a particular user requesting the user authorization for EV charging sessions at the EV charging station owned by that charging service provider. However, a waiting period for receipt of the physical electronic key may be too long, like 1-2 weeks, thereby causing the user to postpone using the EV charging station of interest. Assuming that the user desires to use the EV charging stations of different charging service providers, the total waiting period for receipt of all required physical electronic keys may be much longer. On top of that, the user will hardly be happy with the necessity of keeping several physical electronic keys to hand. As for the charging service provider, it is forced, in this case, to bear the extra costs of producing and mailing the physical electronic key(s) to the user(s).

The embodiments of the present disclosure relate to a technical solution configured to:
  use the equipment of the EV charging station in order to
    read an already-existing or available physical electronic key of the user (or to retrieve its key ID in other words) and to send a user request to the charging service provider for linking the physical electronic key to the pre-created user account; and use the equipment of the charging service provider in order to receive and process the user request, link the physical electronic key to the user account if a linking criterion (which will be discussed later) is met, and to notify the user and the EV charging station about the user authorization.

With that said, the technical solution described herein may conventionally be divided into two sub-solutions, with the first one aimed at requesting user authorization and the second one aimed at responding to the requested user authorization.

The above-mentioned embodiments of the present disclosure may provide, among others:

the user of the EV can gain access to EV charging stations of different charging service providers quickly and efficiently with the aid of his/her single already-existing or available physical electronic key;

the charging service providers can avoid extra costs for producing and mailing new physical electronic keys.

According to an embodiment, the already-existing or available physical electronic key may refer to the physical electronic key described above but being at user's disposal at a time when the user desires to recharge the electric vehicle at the EV charging station of interest. Thus, the available physical electronic key may be produced either by the charging service provider different from that whose EV charging station the user would like to use, or by a provider offering services other than the charging service. For example, it is highly likely that each user of the electric vehicle has his/her own bank (credit or debit) card on hand (which may be one type of the smart card), and this bank card may be used to gain access to the EV charging station. To do this, it is just required to link the bank card to the user account on the charging service provider's side, as will be described later. Correspondingly, the user may use the bank card to execute different financial operations and recharge the electric vehicle at the EV charging station.

FIG. 1 shows a block-scheme of an apparatus 100 for requesting the user authorization for EV charging sessions in accordance with one embodiment of the present disclosure. The apparatus 100 is intended to be part of either a user mobile device, such as a mobile phone, smartphone, laptop, tablet, personal digital assistant, or the like, or the equipment of the EV charging station itself. As shown in FIG. 1, the apparatus 100 comprises a storage 102 and a processor 104 coupled to the storage 102. The storage 102 stores processor executable instructions 106 to be executed by the processor 104 to request the user authorization. Let us remind that the user authorization implies gaining access to the electric energy stored at the EV charging station.

The storage 102 may be implemented as a nonvolatile or volatile memory used in modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor 104 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, or the like. It is worth noting that the processor 104 may be implemented as any combination of the aforesaid. As an example, the processor 104 may be a combination of two or more CPUs, general-purpose processors, etc.

The processor executable instructions 106 stored in the storage 102 may be configured as a computer executable code causing the processor 104 to perform the aspects of the present disclosure. The computer executable code for carrying out operations or steps for the aspects of the present disclosure may be written in any combination of one or more programming languages, such as Java, C, C++, Python, or the like. In some examples, the computer executable code may be in the form of a high-level language or in a pre-compiled form, and be generated by an interpreter (also pre-stored in the storage 102) on the fly.

Figure 2:
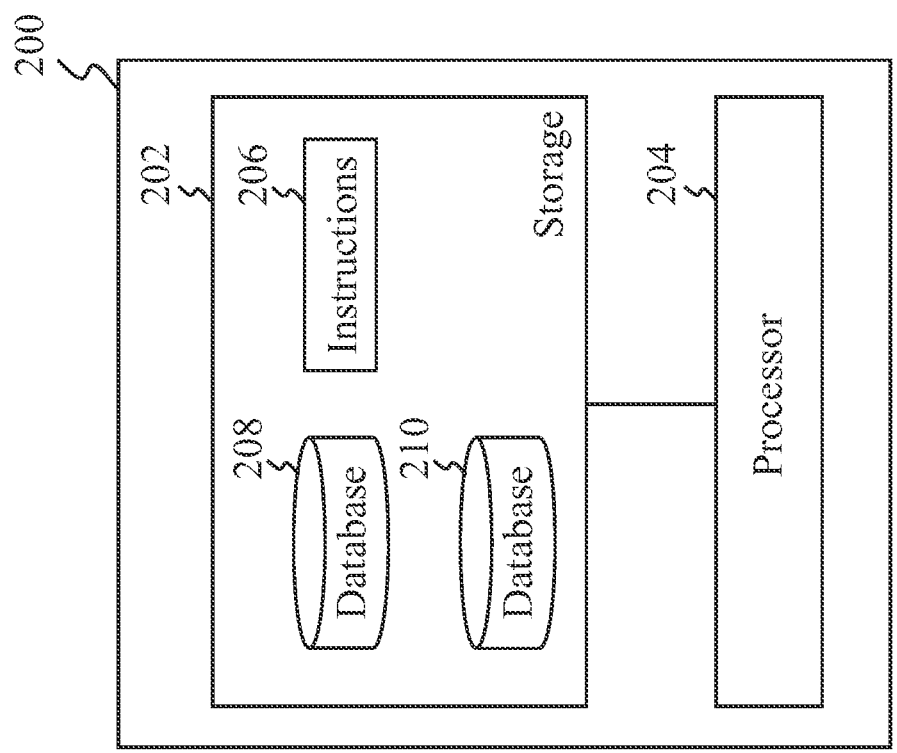
FIG. 2 shows a block-scheme of an apparatus for responding to the user authorization for the EV charging sessions, which is requested by the apparatus in FIG. 1, in accordance with another embodiment of the present disclosure.

FIG. 2 shows a block-scheme of an apparatus 200 for responding to the user authorization for the EV charging sessions, which is requested by the apparatus 100, in accordance with another embodiment of the present disclosure. The apparatus 200 is intended to be located on the charging service provider's side. In one embodiment, the apparatus 200 may be implemented as a back-end computer system. As shown in FIG. 2, the apparatus 200 comprises a storage 202 and a processor 204 coupled to the storage 202. The storage 202 stores processor executable instructions 206 to be executed by the processor 204 to provide the user authorization or non-authorization, as will be discussed later. The memory 202 further comprises a database 208 storing user accounts created by the charging service provider, as well as a database 210 storing the user requests from different users. In one embodiment, the databases 208 and 210 may be combined into a single database.

Each of the storage 202, the processor 204, and the processor executable instructions 206 may be implemented in the same or similar manner as a corresponding analogue in the apparatus 100. As for the databases 208 and 210, they may be structured in a tabular form. In one embodiment, the database 208 (database 210) is constructed such that each row corresponds to a certain user account (user request) and each column corresponds to a certain attribute of the user account (user request). In one other embodiment, each of the databases 208 and 210 may be configured as a set of tables, with each table being associated with a certain user account and user request, respectively. At the same time, the processor 204 may be configured to query and maintain the databases 208 and 210 by using any suitable programming language, for example, Structured Query Language (SQL).

Figure 3:
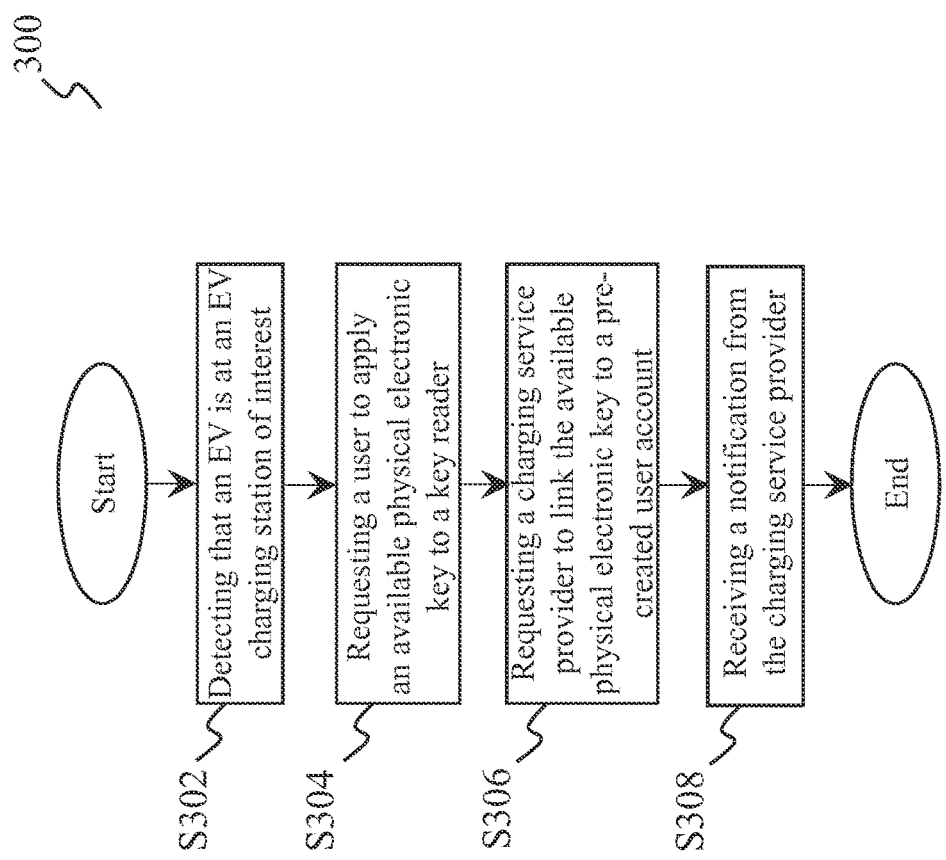
FIG. 3 shows a flowchart for a method for requesting the user authorization for the EV charging sessions in accordance with one more embodiment of the present disclosure.

FIG. 3 shows a flowchart for a method 300 for requesting the user authorization for the EV charging sessions in accordance with one other embodiment of the present disclosure. The method 300 is intended to be performed by the processor 104 of the apparatus 100 when the processor 104 is caused to execute the processor executable instructions 106 stored in the storage 102. Thus, the method 300 is performed on the user's side, or more specifically at the EV charging station where the user intends to recharge the electric vehicle.

As shown in FIG. 3, the method 300 starts with step S302, in which the processor 104 detects that the electric vehicle is at the EV charging station of interest. The EV charging station has its own unique station ID and is intended to have a key reader mounted thereon. The key reader is used in next step S304 of the method 300, in which the processor 104 requests the user to show or apply (depending on the type of the key reader) the already-existing or available physical electronic key to the key reader. By so doing, the key ID of the physical electronic key may be retrieved easily and reliably by using the existing equipment (key reader) of the EV charging station itself. It should also be noted that the key reader may be represented by a card reader or a token reader depending on the above-mentioned types of the physical electronic key. Then, in step 306, the processor 104 requests the charging service provider, with which the user has a pre-created user account, to link the physical electronic key to the user account characterized by a user ID. To do this, the processor 104 sends a user request to the charging service provider. The user request comprises the station ID of the EV charging station, the user ID, and the key ID of the physical electronic key. Said linking means adding the key ID to the user account. The user request is received and processed on the charging service provider's side in accordance with another method, which will be described later with reference to FIG. 5. Here it is just worth noting that the method 300 ends up with step S308, in which the processor 104 receives, from the charging service provider, a notification of user authorization or non-authorization for the EV charging sessions at the EV charging station based on whether the available physical electronic key has been linked to the user account.

In one embodiment, the steps S302-S308 are all implemented as a single software component, such as a mobile application, installed on the user mobile device or the equipment of the EV charging station. The use of the mobile application may simplify and hasten the process of requesting the user authorization. In this case, the processor 104 may be implemented as a mobile application processor inside the user mobile device or the equipment of the EV charging station. With that said, the processor 104 may execute the method 300 upon running the mobile application. As an example, when the electric vehicle to be recharged is at the EV charging station of interest, the user may run the mobile application and press an illustrative button "Add a key" (which is relevant to requesting the user authorization), whereupon the processor 104 starts executing the steps S302-S308 as described above.

Figure 4:
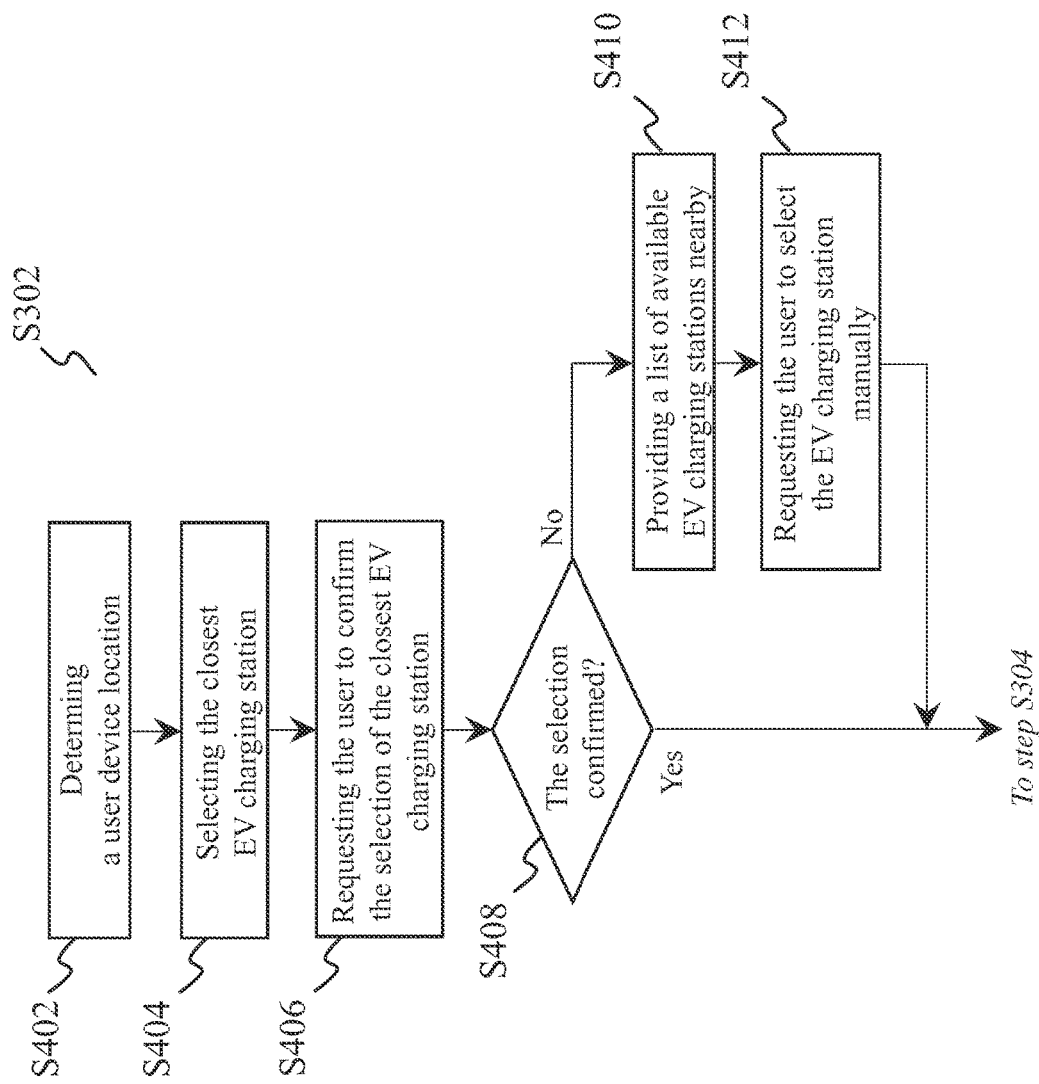
FIG. 4 shows an exemplary sequence of sub-steps constituting the step S302 of the method in FIG. 3.

FIG. 4 shows an exemplary sequence of sub-steps S402-S412 constituting the step S302 in accordance with one more embodiment of the present disclosure. Each of the sub-steps S402-S412 may be performed by the processor 104 with the aid of the running mobile application. The sequence of sub-steps S402-S412 is more preferable for the embodiment in which the apparatus 100 is part of the user mobile device, and may be executed when the EV of the user is in vicinity of the EV charging station of interest. In particular, the processor 104 is first instructed, in the sub-step S402, to locate the user device (for example, by interrogating a built-in GPS sensor inside the user mobile device). Once the location of the user mobile device is found, the processor 104 proceeds with the sub-step S404 in order to select the EV charging station which is the closest to the user mobile device. After that, in the sub-step S406, the processor 104 requests, via the mobile application, the user to confirm the selection of the closest EV charging station (for example, by pressing an illustrative button "Confirm"). If the user confirms the selection of the closest EV charging station (see "Yes" in the sub-step S408), the processor 104 further proceeds with the step S304 of the method 300. However, if the user cancels the selection of the closest EV charging station (for example, by pressing an illustrative button "Cancel"), the processor 104 then provides, in the sub-step S410, the user with a list of available EV charging stations in the vicinity of the user mobile device. Such a list of available EV charging stations may be shown on a display of the user mobile device. The user is then requested, in the sub-step S412, to select the EV charging station of interest manually, whereupon the processor 104 proceeds with the step S304 of the method 300. This allows minimizing or even avoiding location errors caused, for example, by the incorrect operation of the GPS sensor or mobile application.

In one additional embodiment, the method 300 may further comprise the step of triggering a repeating countdown timer in the mobile application upon requesting the user to confirm the selection of the closest EV charging in the sub-step S406 or to select the EV charging station of interest manually in the sub-step S412. If the user makes no choice before the expiration of the repeating countdown timer, the sub-step S406 or S412 is repeated again. The same or different repeating countdown timer may be triggered after the step S304 of the method 300. Thus, the user of the electric vehicle is provided with a recurring reminder about the action to be taken during the execution of the method 300.

In yet another embodiment, if the notification of user authorization for the EV charging sessions is received from the charging service provider, the user may additionally be notified that he/she is authorized to use the EV charging station for recharging the EV from now on by re-applying the physical electronic key to the key reader. In one example, the EV charging station may request the back-end computer system or other equipment of the charging service provider to check whether the key ID of the applied physical electronic key is indicated in the user account, and if yes, start the EV charging session for the EV of the user. In one other example, the charging service provider may locally store the database of user account at each of its EV charging stations, and constantly update the local database in case of creating a new user account or adding a new physical electronic key. In the latter example, the EV charging station check itself whether the key ID of the physical electronic key is indicated in the user account, thereby deciding whether to provide the user with access to the electric energy stored thereon.

Figure 5:
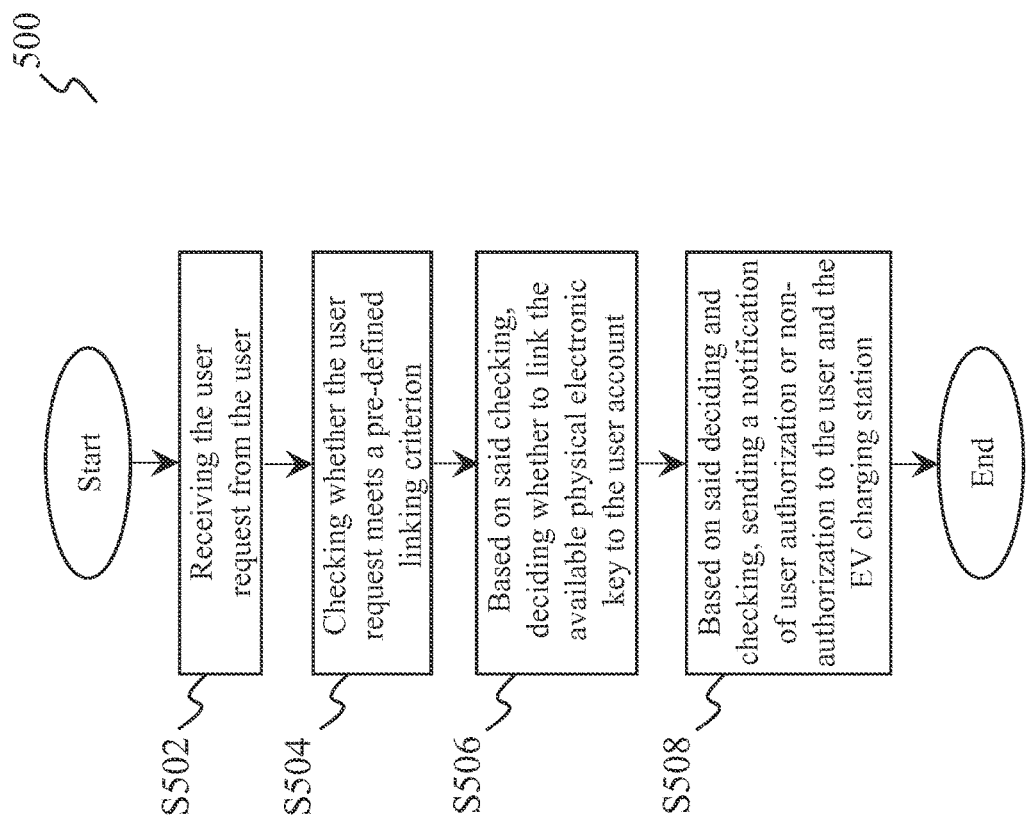
FIG. 5 shows a flowchart for a method for responding to the user authorization for the EV charging sessions, which is requested by using the method in FIG. 3, in accordance with one other embodiment of the present disclosure.

FIG. 5 shows a flowchart for a method 500 for responding to the user authorization for the EV charging sessions, which is requested by using the method 300, in accordance with one other embodiment of the present disclosure. The method 500 is intended to be performed by the processor 204 of the apparatus 200 when the processor 204 is caused to execute the processor executable instructions 206 stored in the storage 202. Thus, the method 500 is performed on the charging service provider's side, or more specifically by using the equipment of the charging service provider, such as the back-end computer system.

As shown in FIG. 5, the method 500 starts with step S502, in which the processor 204 receives the user request sent by the user of the EV from the EV charging station of interest. The user request relates to linking the available physical electronic key belonging to the user of the EV to the pre-created user account characterized by the user ID. It should again be noted that the user request itself comprises the station ID of the EV charging station, the user ID, and the key ID of the available physical electronic key, and the key ID is retrieved by applying the available physical electronic key to the key reader arranged at the EV charging station. Next, in step S504, the processor 204 is instructed to check whether the user request meets a pre-defined linking criterion. Then, based on said checking in the step S504, the processor 204 decides, in step S506, whether to link the available physical electronic key to the user account. After that, the method 500 ends up with step S508, in which the processor 204 notifies the user and the EV charging station about the user authorization or non-authorization for the EV charging sessions based on the results of said checking in the step S504 and said deciding in the step S506.

In one embodiment, the pre-defined linking criterion is as follows: the user account does not comprise the same key ID as the retrieved key ID of the available physical electronic key. With such a linking criterion, there may be the following two execution scenarios of the method 500:

1) If the user account comprises the same key ID as the retrieved key ID of the available physical electronic key, the step S504 consists in verifying that the user request does not meet the pre-defined linking criterion. In turn, the step S506 consists in deciding not to link the available physical electronic key to the user account, but at the same time the step S508 consists in sending the notification of the user authorization to the user and the EV charging station;
2) If the user account does not comprise the same key ID as the retrieved key ID of the available physical electronic key, the step S504 consists in verifying that the user request meets the pre-defined linking criterion. In turn, the step S506 consists in deciding to link the available physical electronic key to the user account, and the step S508 remains unchanged, i.e. consists in sending the notification of the user authorization to the user and the EV charging station.

Thus, the linking criterion above leads to the same outcome (i.e. the user authorization) but by using the above-described two different process flows. With this linking criterion, it is possible to avoid linking the same physical electronic key more than one time to the user account.

In one embodiment, the step S502 of the method 500 may comprises the sub-steps of: storing the station ID, the user ID, the key ID, a reception time of the user request, and a pre-defined expiration time of the user request as a new record in the database 210 of user requests; and marking the user request as being processed until the expiration time of the user request is over (i.e. when the user request is no longer valid). By so doing, it is possible to set a more reliable linking criterion consisting of the following sub-criteria:

(i) the user account does not comprise the same key ID as the retrieved key ID of the available physical electronic key;
(ii) the database of user requests comprises the record corresponding to the user request from the user of the EV; and
(iii) the user request is still marked as being processed (i.e. the expiration time of the user request is not over).

Figure 6:
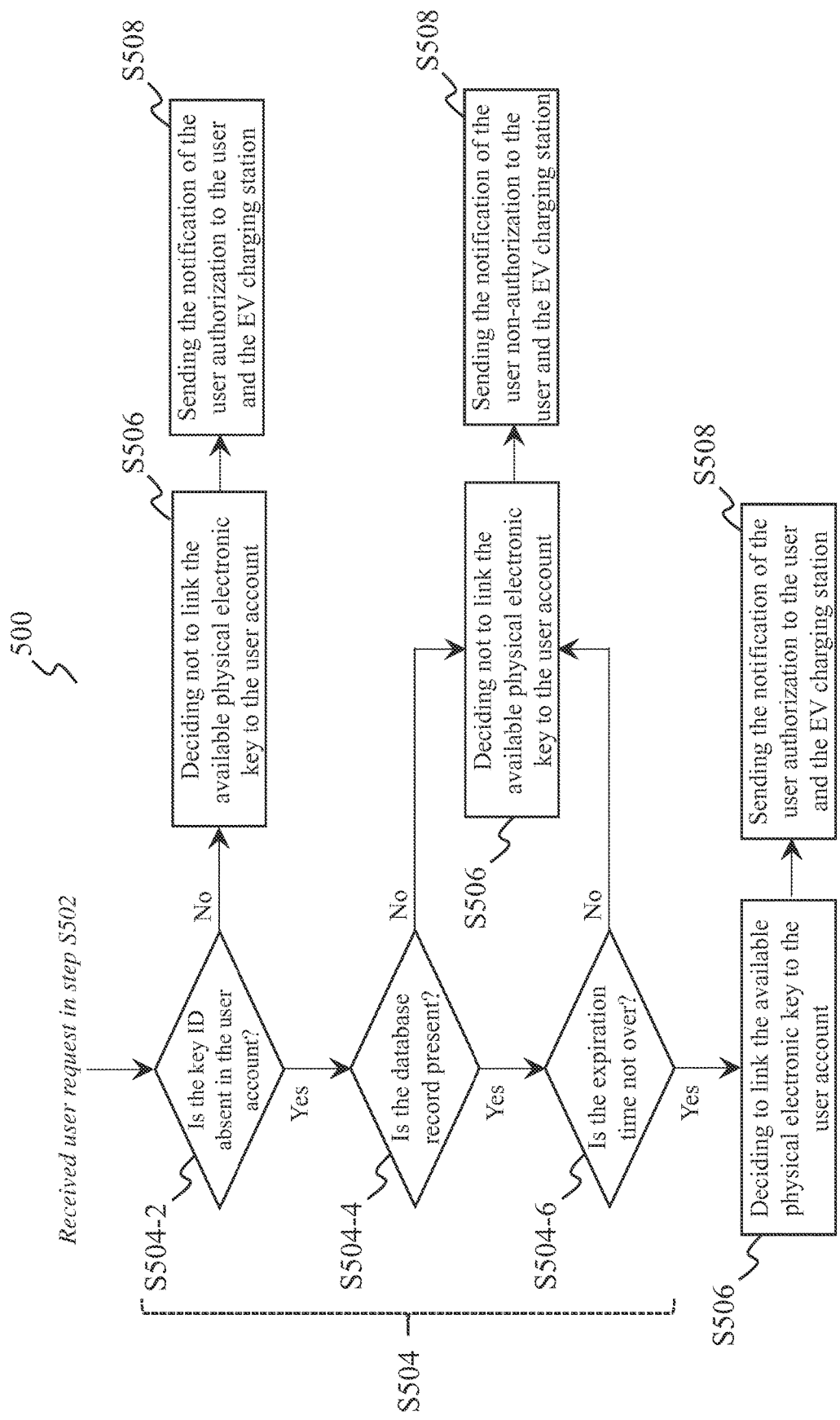
FIG. 6 shows four possible execution scenarios of the method in FIG. 5 depending on the selection of a linking criterion.

The use of sub-criteria (i)-(iii) will be now explained in more detail with reference to FIG. 6. In particular, FIG. 6 shows four possible execution scenarios of the method 500 due to the division of the step S504 into three sub-steps S504-2-S504-6 based on sub-criteria (i)-(iii). Each execution scenario starts with the step S502 of receiving the user request and storing its attributes in the database 210 of user requests. Further, the processor 204 checks whether sub-criterion (i) is met in the sub-step S504-2. If the user account already comprises the same key ID (see "No" in the sub-step S504-2), a first execution scenario is then implemented. In the first execution scenario, the processor 204 decides not to link the available physical electronic key to the user account in the step S506 but at the same time sends the notification of the user authorization to the user and the EV charging station in the step S508. After that, the method 500 ends up.

However, if there is "Yes" in the sub-step S504-2 (i.e. the user account does not comprise the same key ID), the processors 204 proceeds to check sub-criterion (ii) in the sub-step S504-4. If the database 210 of user requests does not comprise the record corresponding to the user request from the user of the EV (see "No" in the sub-step S504-4), a second execution scenario is then implemented. In the second execution scenario, the processor 204 decides not to link the available physical electronic key to the user account in the step S506 but now sends the notification of the user non-authorization to the user and the EV charging station in the step S508. After that, the method 500 ends up.

Further, if there is "Yes" in the sub-step S504-4 (i.e. the database 210 of user requests comprises the record corresponding to the user request from the user of the EV), the processors 204 proceeds to check sub-criterion (iii) in the sub-step S504-6. If the user request is no longer valid (see "No" in the sub-step S504-6), a third execution scenario is then implemented. Similar to the second execution scenario, in the third execution scenario the processor 204 decides not to link the available physical electronic key to the user account in the step S506 and sends the notification of the user non-authorization to the user and the EV charging station in the step S508. After that, the method 500 ends up.

Finally, if there is "Yes" in the sub-step S504-6 (i.e. the user request is still marked as being processed), the processors 204 verifies that all sub-criteria (i)-(iii) are met. In this case, a fourth execution scenario is implemented, in which the processor 204 decides to link the available physical electronic key to the user account in the step S506 (i.e. to add the key ID to the user account) and sends the notification of the user authorization to the user and the EV charging station in the step S508. After that, the method 500 ends up.

On embodiment is possible, in which the user account is further characterized by an account balance. In this case, the method 500 may further comprise the step of temporarily disabling the user authorization previously provided for the EV charging sessions if the account balance is not enough to cover the costs for the next EV charging session. The method 500 may additionally comprise the step of notifying the user of the EV that the user authorization will be enabled upon refilling the account balance.

It should be noted that each block, step or sub-step of the method 300 and 500, or any combinations of the blocks, steps or sub-steps, can be implemented by various means, such as hardware, firmware, and/or software. As an example, one or more of the blocks, steps or sub-steps described above can be embodied by processor executable instructions, data structures, program modules, and other suitable data representations. Furthermore, the processor executable instructions which embody the blocks, steps or sub-steps described above can be stored on a corresponding data carrier and executed by at least one processor like the processor 104 or 204 of the apparatus 100 or 200, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for requesting user authorization for electric vehicle (EV) charging sessions, comprising:
   determining that an EV is at an EV charging station of interest by using an application installed either on a user mobile device that is at the same location as the EV or on equipment of the EV charging station, the EV charging station having a station identifier (ID); and
   requesting, by using the application, the user authorization for the EV charging sessions at the EV charging station;
   wherein said requesting the user authorization comprises:
   requesting, by using the application, a user of the EV to apply an available physical electronic key having a key ID to a key reader arranged at the EV charging station, thereby retrieving the key ID of the available physical electronic key, the available physical electronic key being provided to the user by a third party rather than a charging service provider serving the EV charging station;
   sending, by using the application, a user request to the charging service provider for linking the available physical electronic key to a user account pre-created in a database of user accounts resided on the charging service provider's side, the user account being characterized by a user ID, the user request comprising the station ID of the EV charging station, the user ID, the key ID of the available physical electronic key, and said linking comprises storing the key ID in the user account; and
   receiving, by using the application and from the charging service provider, a notification of user authorization or non-authorization for the EV charging sessions at the EV charging station based on whether the available physical electronic key has been linked to the user account.

2. The method of claim 1, wherein the available physical electronic key comprises a smart card, Radio Frequently Identification (RFID) card, Near Field Communication (NFC) token, or Bluetooth token, and wherein the key reader comprises a card reader or a token reader.

3. The method of claim 1, wherein said determining comprises, when the application is installed on the user mobile device:
   by using the application:
   locating the user mobile device;
   selecting the EV charging station which is the closest to the user mobile device; and
   requesting the user of the EV to confirm the selection of the closest EV charging station.

4. The method of claim 3, further comprising:
   by using the application:
   if the user of the EV cancels the selection of the closest EV charging station, providing the user of the EV with a list of available EV charging stations in the vicinity of the user mobile device; and
   requesting the user of the EV to select the EV charging station of interest manually.

5. The method of claim 4, further comprising:
   triggering a repeating countdown timer in the application; and
   repeating said requesting the user to confirm the selection of the closest EV charging or to select the EV charging station of interest manually every time there is no confirmation of the closest EV charging station or no selection of one other of the list of available EV charging stations before the expiration of the repeating countdown timer.

6. The method of claim 1, further comprising, after said requesting the user of the EV to apply the available physical electronic key:
   triggering a repeating countdown timer in the application; and
   repeating said requesting every time the user does not apply the available physical electronic key before the expiration of the repeating countdown timer.

7. The method of claim 1, further comprising, if the notification of user authorization for the EV charging sessions is received:
   notifying, by using the application, the user that he/she is authorized to use the EV charging station for recharging the EV from now on by merely applying the physical electronic key reader.

8. A method for responding to requested user authorization for electric vehicle (EV) charging sessions, comprising:
   receiving a user request for user authorization for the EV charging sessions at an EV charging station of interest, the user request being sent by a user of an EV using an application installed either on a user mobile device that is at the same location as the EV to be recharged or on equipment of the EV charging station;
   determining whether the user should be authorized for the EV charging sessions at the EV charging station; and
   based on said determining, notifying the user and the EV charging station about the user authorization or non-authorization; wherein the user request relates to linking an available physical electronic key belonging to the user to a pre-created user account, the available physical electronic key being provided to the user by a third party rather than a charging service provider serving the EV charging station, the user account being characterized by a user ID and pre-created in a database of user accounts resided on the charging service provider's side, wherein the user request comprises a station ID of the EV charging station, the user ID, and a key ID of the available physical electronic key, the key ID being retrieved by applying the available physical electronic key to a key reader arranged at the EV charging station, and wherein said determining comprises:
   checking whether the user request meets a pre-defined linking criterion;
   based on said checking, deciding whether to link the available physical electronic key to the user account, said linking comprising storing the key ID in the user account.

9. The method of claim 8, wherein the available physical electronic key comprises a smart card, Radio Frequency Identification (RFID) card, Near Field Communication (NFC) token, or Bluetooth token, and wherein the key reader comprises a card reader or a token reader.

10. The method of claim 8, wherein the pre-defined linking criterion is as follows:
the user account does not comprise the same key ID as the retrieved key ID of the available physical electronic key.

11. The method of claim 10, wherein
said checking comprises verifying that the user request does not meet the pre-defined linking criterion;
said deciding comprises deciding not to link the available physical electronic key to the user account; and
said notifying comprises notifying the user and the EV charging station of interest about the user authorization.

12. The method of claim 10, wherein
said checking comprises verifying that the user request meets the pre-defined linking criterion;
said deciding comprises dividing to link the available physical electronic key to the user account; and
said notifying comprises notifying the user and the EV charging station of interest about the user authorization.

13. The method of claim 8, wherein said receiving comprises:
storing the station ID, the user ID, the key ID, a reception time of the user request, and a pre-defined expiration time of the user request as a new record in a database of user requests; and
marking the user request as being processed until the expiration time of the user request is over.

14. The method of claim 13, wherein the pre-defined linking criterion comprises the following sub criteria:
(i) the user account does not comprise the same key ID as the retrieved key ID of the available physical electronic key;
(ii) the database of user requests comprises the record corresponding to the user request from the user of the EV; and
(iii) the user request is still marked as being processed.

15. The method of claim 14, wherein
said checking comprises verifying that sub-criteria (i)-(iii) are all met;
said deciding comprises deciding to link the available physical electronic key to the user account; and
said notifying comprises notifying the user and the EV charging station of interest about the user authorization.

16. The method of claim 14, wherein
said checking comprises verifying that sub-criterion (i) is met, but any one of sub-criteria (ii) and (iii) is not met;
said deciding comprises deciding not to link the available physical electronic key to the user account; and
said notifying comprises notifying the user and the EV charging station of interest about the user non-authorization.

17. The method of claim 8, wherein the user account is further characterized by an account balance, and wherein the method further comprises:
disabling the user authorization for the EV charging sessions if the account balance is not enough to cover the costs for the next EV charging session; and
notifying the user of the EV that the user authorization will be enabled upon refilling the account balance.

18. An apparatus for requesting user authorization for electric vehicle (EV) charging sessions, comprising:
at least one processor; and
a memory coupled to the at least one processor and storing processor-executable instructions,
wherein the processor-executable instructions, when executed by the at least one processor, cause the at least one processor to perform the method of claim 1.

19. An apparatus for responding to requested user authorization for electric vehicle (EV) charging sessions, comprising:
at least one processor; and
a memory coupled to the at least one processor and storing processor-executable instructions,
wherein the processor-executable instructions, when executed by the at least one processor, cause the at least one processor to perform the method of claim 8.

20. A computer program product comprising a non-transitory computer-readable storage medium storing a computer program which, when executed by at least one processor, causes the at least one processor to perform the method of claim 1.

21. A computer program product comprising a non-transitory computer-readable storage medium storing a computer program which, when executed by at least one processor, causes the at least one processor to perform the method of claim 8.

* * * * *